(12) United States Patent
Schnabel

(10) Patent No.: US 6,286,657 B1
(45) Date of Patent: Sep. 11, 2001

(54) TRANSPORTING APPARATUS

(75) Inventor: Wolfgang Schnabel, Oststeinbek (DE)

(73) Assignee: Topack Verpackungstechnik GmbH, Schwarzenbek (DE)

( * ) Notice: Subject to any disclaimer, the term of this patent is extended or adjusted under 35 U.S.C. 154(b) by 0 days.

(21) Appl. No.: 09/511,895

(22) Filed: Feb. 23, 2000

(30) Foreign Application Priority Data

Feb. 23, 1999 (DE) .............................................. 199 07 579

(51) Int. Cl.⁷ .......................... B65G 29/00; B65G 37/00; B65G 47/04; B65G 47/34; B65G 47/86
(52) U.S. Cl. ..................... 198/611; 198/470.1; 198/803.3
(58) Field of Search .............................. 198/469.1, 470.1, 198/611, 612, 803.8, 803.9, 803.3

(56) References Cited

U.S. PATENT DOCUMENTS

| | | | |
|---|---|---|---|
| 4,198,258 | * | 4/1980 | Glosmann ........................... 53/466 X |
| 4,617,780 | * | 10/1986 | Focke et al. ........................ 53/466 X |
| 5,680,745 | * | 10/1997 | Brizzi et al. ....................... 53/448 X |
| 5,697,490 | * | 12/1997 | Raque ........................... 198/470.1 |
| 5,765,677 | * | 6/1998 | Ghini et al. ................... 198/470.1 X |
| 6,047,529 | * | 4/2000 | Draghetti ........................... 53/466 X |

FOREIGN PATENT DOCUMENTS

| | | |
|---|---|---|
| 37 42 404 A1 | 6/1988 | (DE) . |
| 43 00 149 A1 | 7/1994 | (DE) . |
| 195 23 659 C1 | 9/1996 | (DE) . |
| 195 32 092 A1 | 3/1997 | (DE) . |
| 1 595 159 | 8/1981 | (GB) . |
| 57-23520 | 2/1982 | (JP) . |

\* cited by examiner

Primary Examiner—Christopher P. Ellis
Assistant Examiner—Gene O. Crawford
(74) Attorney, Agent, or Firm—Venable; Robert Kinberg

(57) ABSTRACT

Apparatus for transporting cartons of cigarette packets or analogous block-shaped commodities employs an indexible turret which advances a series of successive equidistant commodities along an arcuate horizontal path into the inlet of a straight horizontal second path defined by an elongated reach of an endless belt conveyor. The conveyor carries spaced-apart receptacles each defined in part by an outwardly extending retaining element affixed to the belt conveyor, and in part by a two-armed lever which is pivotably mounted on the conveyor and is biased by one or more springs to an idle position in which the respective receptacle can receive a commodity from the turret during travel past the inlet of the second path. A commodity which is in the process of entering a receptacle at the inlet bears upon one arm of the lever against the spring bias to thus move the other arm to a position in which the other arm cooperates with the retaining element to advance the commodity along the second path. The other arm and the retaining element cooperate with one or more fixed rails to confine the commodity in a filled receptacle to movement along the second path.

36 Claims, 5 Drawing Sheets

TRANSPORTING APPARATUS

CROSS-REFERENCE TO RELATED CASES

This application claims the priority of German patent application Serial No. 199 07 579.4 filed Feb. 23, 1999. The disclosure of the above-referenced German patent application, as well as that of each U.S. and foreign patent and patent application mentioned in the specification of the present application, is incorporated herein by reference.

BACKGROUND OF THE INVENTION

The present invention relates to transporting apparatus in general, and more particularly to improvements in apparatus for transporting discrete commodities along a first path, from the first path into a second path, and along the second path. Typical examples of commodities which can or which must be transported in an apparatus of the type to which the apparatus of the present invention belongs are block-shaped objects such as packets containing plain or filter cigarettes or other rod-shaped articles of the tobacco processing industry and/or so-called cartons which contain predetermined numbers of packets.

It is already known to transport cartons of cigarette packets along a first path having an outlet which is inclined relative to the inlet of a second path. The second path is defined by or is adjacent a transporting unit having a series of discrete receptacles each of which can receive at the outlet of the first path at least one carton for advancement along the second path, e.g., to a station where sets of cartons are introduced into discrete boxes or to a station where the cartons are draped into envelopes of paper or other suitable wrapping material. Each receptacle comprises at least two spaced-apart carton-engaging elements at least one of which is movable toward and away from the other engaging element, namely between a position in which a carton can readily enter into or leave the receptacle and a position in which the carton is reliably held in the receptacle for the purpose of advancing along the second path.

Conventional apparatus of the just outlined character are often employed in apparatus wherein cigarette packets, cartons of cigarette packets or other block-shaped commodities must be supplied to, transferred at and advanced from a transfer station with a high degree of accuracy and predictability. For example, the first conveyor which supplies block-shaped commodities to the transfer station can constitute an indexible turret, and the second conveyor which receives successive commodities of a series of successive commodities from the turret can include or constitute an endless belt, band or chain conveyor. The latter can be provided with a set of equidistant receptacles in the form of pockets destined to accept and to transport discrete commodities each of which can constitute a carton confining a number of properly distributed or arrayed cigarette packets or the like.

Published German patent applications Serial Nos. 43 00 149 A1 and 195 32 092 A1 disclose transporting apparatus of the above outlined character. The receptacles of the second conveyor are provided with pairs of mobile jaws which are shiftable by disc cams and/or other types of cams in order to ensure that a receptacle can receive a commodity while it advances along the inlet of the second path and that such receptacle can thereupon retain the commodity in a desired position during advancement along and toward the outlet of the second path. The movements of the jaws must take place with a rather high degree of accuracy for a number of reasons, namely to ensure predictable entry of successively delivered commodities into the receptacles or pockets of the second conveyor (i.e., an entry which does not entail damage to—such as deformation of—the commodities), to ensure the advancement of commodities with the respective receptacles in optimum positions for predictable evacuation, and to ensure predictable and rapid transfer of commodities from their receptacles upon arrival at the outlet of the second path. Furthermore, successive commodities should not collide with each other and they should not jam the transfer station between the outlet of the first conveyor (such as the aforementioned turret) and the inlet of the second conveyor.

A drawback of the apparatus which are disclosed in the aforementioned published German patent applications is that the controls for the mobile jaws of the receptacles are very complex, expensive and prone to malfunction. Furthermore, such complex controls necessitate frequent inspection, adjustments, cleaning and/or other time-consuming maintenance work during which the apparatus, or an entire production line employing such transporting apparatus, is idle with attendant huge losses in output. Moreover, the controls take up substantial amounts of space which is at a premium in a modern cigarette making and/or processing (such as packing) plant.

OBJECTS OF THE INVENTION

An object of the invention is to provide a novel and improved apparatus wherein the changes in the condition of receptacles (e.g., changes in the size and/or shape of the receptacles) do not necessitate the utilization of any automated and/or other complex equipment.

Another object of the invention is to provide an apparatus wherein the commodities which must leave a first conveyor or transporting unit for the purpose of entering the receptacles of a second conveyor or transfer unit are caused to share all movements of the respective receptacles in a novel and improved way.

A further object of the invention is to provide the receptacles with novel and improved means for triggering a reduction in the sizes of the respective receptacles when such receptacles reach optimum positions for reception of commodities in the form of cigarette packets, cartons containing sets of cigarette packets or other substantially block-shaped commodities.

An additional object of the invention is to provide a production line which embodies one or more apparatus of the above outlined character.

Still another object of the invention is to provide an apparatus wherein the conveyed commodities can perform certain important functions which contribute to simplicity, reliability, compactness and reduced cost of the improved apparatus.

A further object of the invention is to provide a novel and improved method of transferring block-shaped commodities from a first path into a different second path at a high frequency, without damage to the commodities, and with a pronounced reduction of rejects.

SUMMARY OF THE INVENTION

The invention is embodied in an apparatus for transporting commodities, such as so-called cartons which contain soft or hinged-lid packets of plain or filter cigarettes or other rod-shaped smokers' products. The improved apparatus comprises a first transporting unit including guide means defining a first path having an inlet. The first transporting unit further includes driven receptacles which are movable along the first path in a predetermined direction past and beyond the inlet, and each receptacle comprises a plurality of commodity engaging elements including first and second elements. At least one of the first and second elements is movable relative to the other of the first and second elements between a first position in which the receptacle can accept a commodity and a second position in which a commodity being received in the receptacle is compelled to move with the receptacle along the first path beyond the inlet. The improved apparatus further comprises a second transporting unit including second guide means defining a second path having a portion arranged to deliver successive commodities of a series of commodities to the inlet of the first path. The aforementioned portion of the second path and the inlet of the first path are oriented to permit entry of commodities from the second path into a receptacle at the inlet of the first path in the first position of the respective at least one engaging element. Each receptacle further comprises means for effecting a movement of the at least one engaging element of such receptacle at the inlet of the first path toward the other engaging element of the receptacle in response to impingement upon by a commodity at the aforementioned portion of the second path.

It is clear that, instead of serving as cartons for packets of plain or filter cigarettes or the like, the commodities which can be manipulated by the improved apparatus can constitute other types of block-shaped objects preferably having at least substantially identical sizes and shapes.

The inlet of the first path and the aforementioned portion of the second path preferably make an acute or an obtuse (i.e., an oblique) angle.

The first and second engaging elements of each receptacle can be (and preferably are) spaced apart from each other, and the movement effecting means of each receptacle preferably includes means for moving the at least one engaging element toward the other engaging element of such receptacle. The arrangement is or can be such that the at least one engaging element of each receptacle is movable relative to the other engaging element in and counter to the predetermined direction; such movement takes place while the respective receptacle is located at the inlet of the first path.

Each receptacle can be constructed, assembled and mounted in such a way that its movement effecting means is movable by a commodity at the inlet of the first path from an idle position to an operative position to thus effect the aforementioned movement of the at least one engaging element toward the other engaging element of such receptacle. The apparatus preferably further comprises hold-down means for maintaining the commodity which has moved the movement effecting means at the inlet to the operative position in engagement with the respective movement effecting means; such hold-down means can form part of the guide means which defines the first path. The hold-down means is arranged to engage the commodity in the first path at or at least downstream of the inlet (as seen in the predetermined direction). It is presently preferred to employ a stationary hold-down means which defines a portion of the first path.

The hold-down means and the receptacle (or each of several receptacles) advancing along the first path define a chamber for a commodity in the first path; the hold-down means and the movement effecting means of the receptacles in the first path face each other and confine the commodities in such receptacles to movement along the first path.

In accordance with a presently preferred embodiment, the hold-down means comprises at least one elongated stationary rail along which successive commodities slide during movement along the first path.

The apparatus (e.g., each receptacle) preferably further comprises means for mechanically coupling the at least one element of each receptacle to the respective movement effecting means. For example, the at least one element of each receptacle can be mounted for pivotal movement relative to the guide means of the first transporting unit. The means for mechanically coupling can be designed in such a way that the at least one engaging element of each receptacle is rigidly connected with the respective movement effecting means. For example, each receptacle can comprise a lever which is pivotable relative to the guide means of the first transporting unit; each such lever can include a first arm constituting the at least one element and a second arm constituting the movement effecting means of the respective receptacle. Each such receptacle can further comprise a fulcrum for the respective lever, and the arm of each lever can extend at least substantially at right angles to the axis of the respective fulcrum. Each of the levers can be mounted for pivotal movement about a substantially horizontal axis. Moreover, the pivot axes of the levers are or can be at least substantially normal to the predetermined direction. The first arms of the levers can be at least substantially normal to the respective second arms. For example, each first arm can be provided with a first commodity-contacting surface, and each second arm can be provided with a second commodity-contacting surface which is at least substantially normal to the first surface.

The first and second engaging elements of each receptacle are, or can be, at least substantially parallel to each other in the second position of the at least one element of the respective receptacle.

The first and second engaging elements of each receptacle can be provided with commodity-contacting surfaces which are at least substantially parallel to each other and are at least substantially normal to the predetermined direction in the second position of the respective at least one engaging element. Such commodity-contacting surfaces can constitute at least substantially plane surfaces which are at least substantially parallel to each other while in contact with a commodity in the first path. Furthermore, such commodity-contacting surfaces can be at least substantially normal to the first path (i.e., to the predetermined direction) while in contact with a commodity in the first path.

The second path is or can constitute an arcuate path and can be located in a predetermined (e.g., at least substantially horizontal) plane. As already mentioned hereinbefore, the first and second entraining elements of each of the receptacles can constitute the arms of a lever which is pivotable about an axis extending at least substantially at right angles to the predetermined plane. The second path can constitute a circular path (or a portion of a circular path), and the second transporting unit which defines such second path can constitute an indexible turret, e.g., an upright turret.

The first transporting unit can constitute or form part of an endless belt or band or chain conveyor. The first path can constitute a straight path, and the first and second entraining elements of a receptacle in the first path are (or can be) located one behind the other (as seen in the predetermined direction). Each of the receptacles is preferably arranged to accept at least one commodity during advancement of the respective first and second entraining elements along the inlet of the first path.

The endless conveyor is or can be indexed in synchronism with the turret conveyor.

The novel features which are considered as characteristic of the invention are set forth in particular in the appended claims. The improved apparatus itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
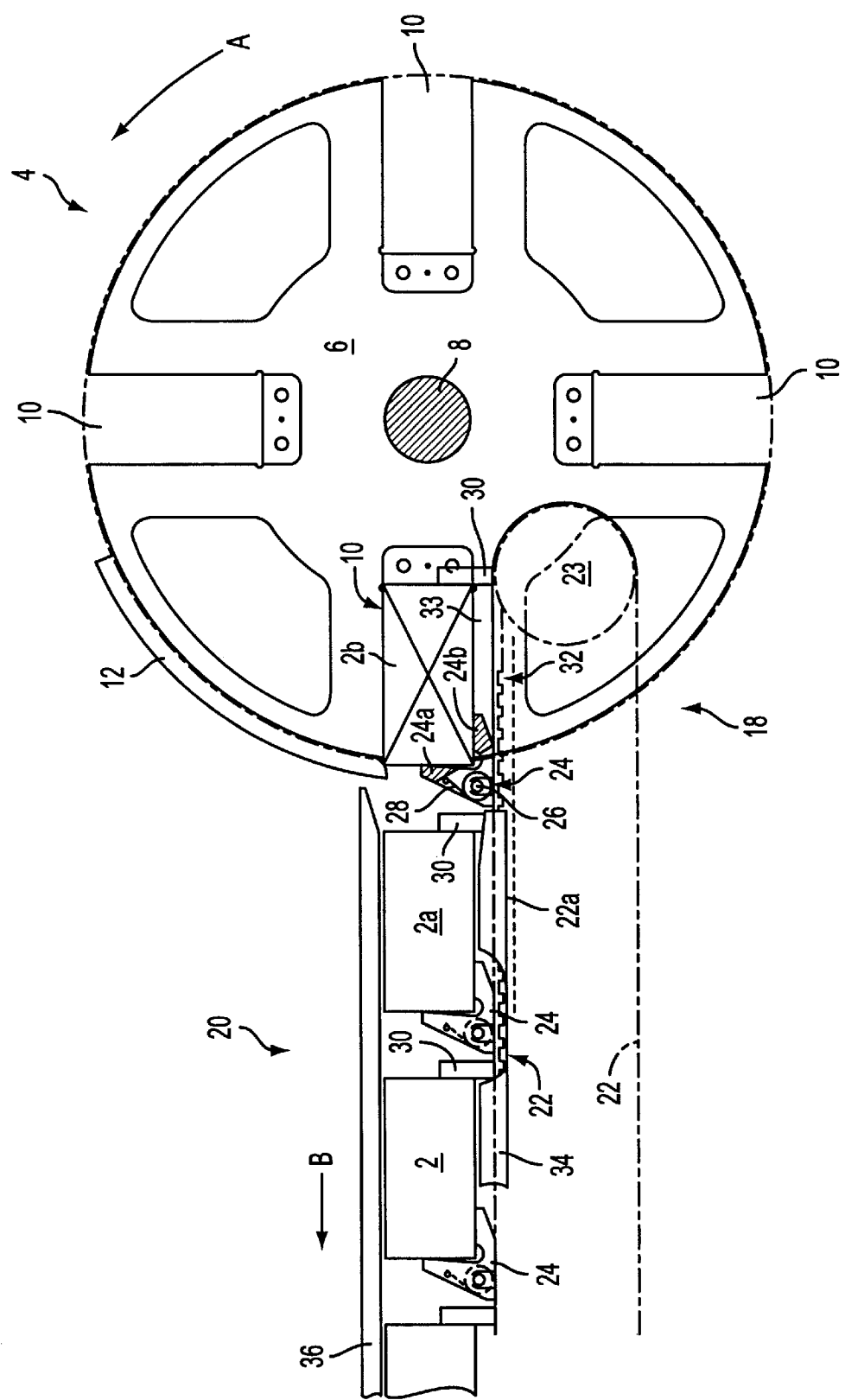
FIG. 1 is a fragmentary schematic side elevational view of a transporting apparatus which embodies one form of the present invention, an elongated block-shaped commodity being confined and held in a receptacle at the inlet of the first path and additional commodities being confined and held in the receptacles located downstream of the inlet.

The apparatus which is shown in the drawings is designed for the transport of elongated block-shaped commodities each of which can constitute a so-called carton containing an array of, for example, ten packets of plain or filter cigarettes or other rod-shaped articles of the tobacco processing industry. Such commodities (hereinafter called cartons for short) can be turned out by a machine known as B90 or G90 (both distributed by the assignee of the present application), and the improved apparatus can serve to transport a series of successive cartons from a B90 or G90 machine directly to a boxing machine which confines groups of cartons in boxes (e.g., to a so-called CP 90 case packer (distributed by the assignee of the present application) or to machine which confines successive cartons in films of transparent plastic material (e.g., a machine which is known as Pewo-Fold overwrapper and is also distributed by the assignee of the present application).

The drawings merely show a small fraction of a long series of successive cartons including a foremost carton 2 which is on the way, e.g., to a CP 90 case packer, a second carton 2a which is also in the process of being advanced to the case packer, a third carton 2b at a transfer station 18 between a first or foremost transporting unit or conveyor 20 of the improved apparatus and a second or rear transporting unit or conveyor 4, and a fourth carton 2c (shown in FIGS. 3a to 3c) which is supported by the conveyor 4 and is in the process of advancing toward the transfer station 18. However, it is clear that the improved apparatus can be designed for the transport of other types of commodities, for example, soft or hinged-lid packets of plain or filter cigarettes or other rod-shaped articles of the tobacco processing industry as well as commodities which have nothing in common with the making of smokers' products.

The illustrated second conveyor 4 is a turret conveyor which is indexible about the horizontal axis of a shaft 8. The shaft 8 carries three equidistant discs 6 having peripheral surfaces provided with radially inwardly extending recesses 10 for portions of cartons. Each of the illustrated discs 6 is provided with four equidistant recesses 10, and each recess 10 of any given disc 6 registers with a recess 10 of each other disc. The dimensions of all recesses are identical and each such recess has a rectangular outline correponding to that of a carton 2 or 2a or 2b or 2c, and so on.

Figure 2:
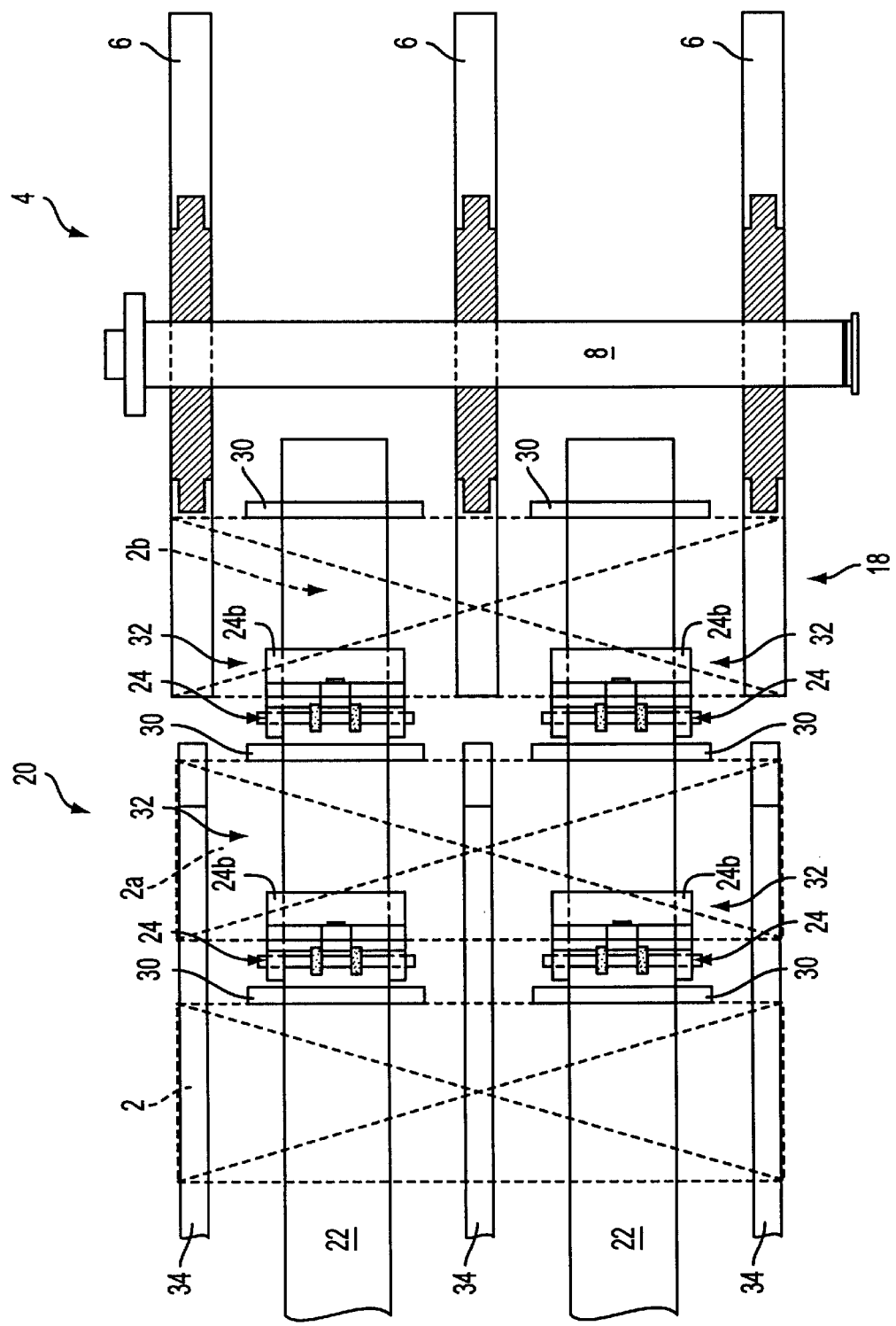
FIG. 2 is a plan view of that portion of the apparatus which is shown in FIG. 1.
Figure 3A:
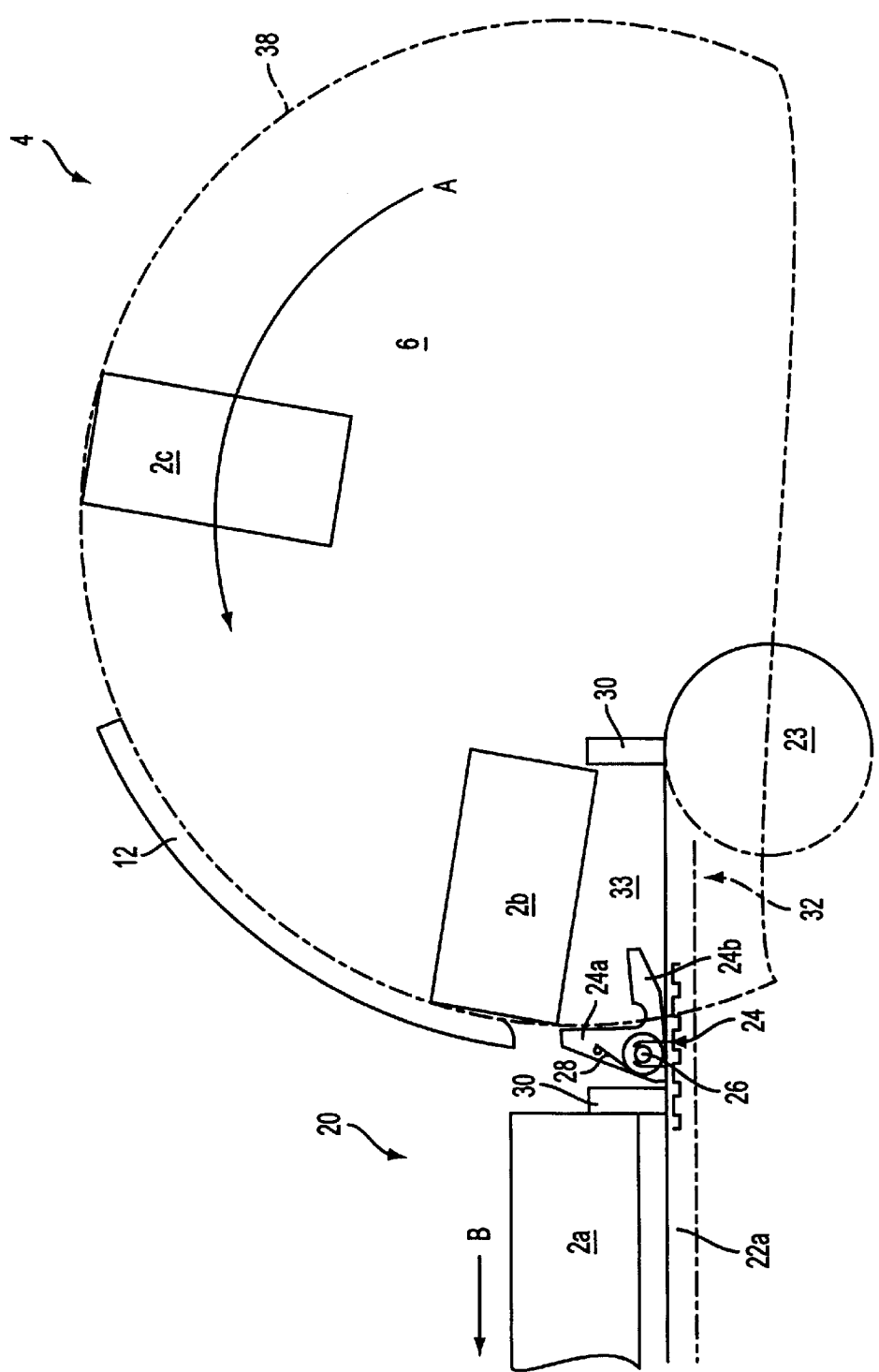
FIG. 3a is an enlarged view of a detail of the structure shown in FIG. 1, a commodity being shown during the last stage of indexing of the second transporting unit in a direction to introduce such. commodity into an empty receptacle at the inlet of the path defined by the guide means of the first transporting unit.
Figure 3B:
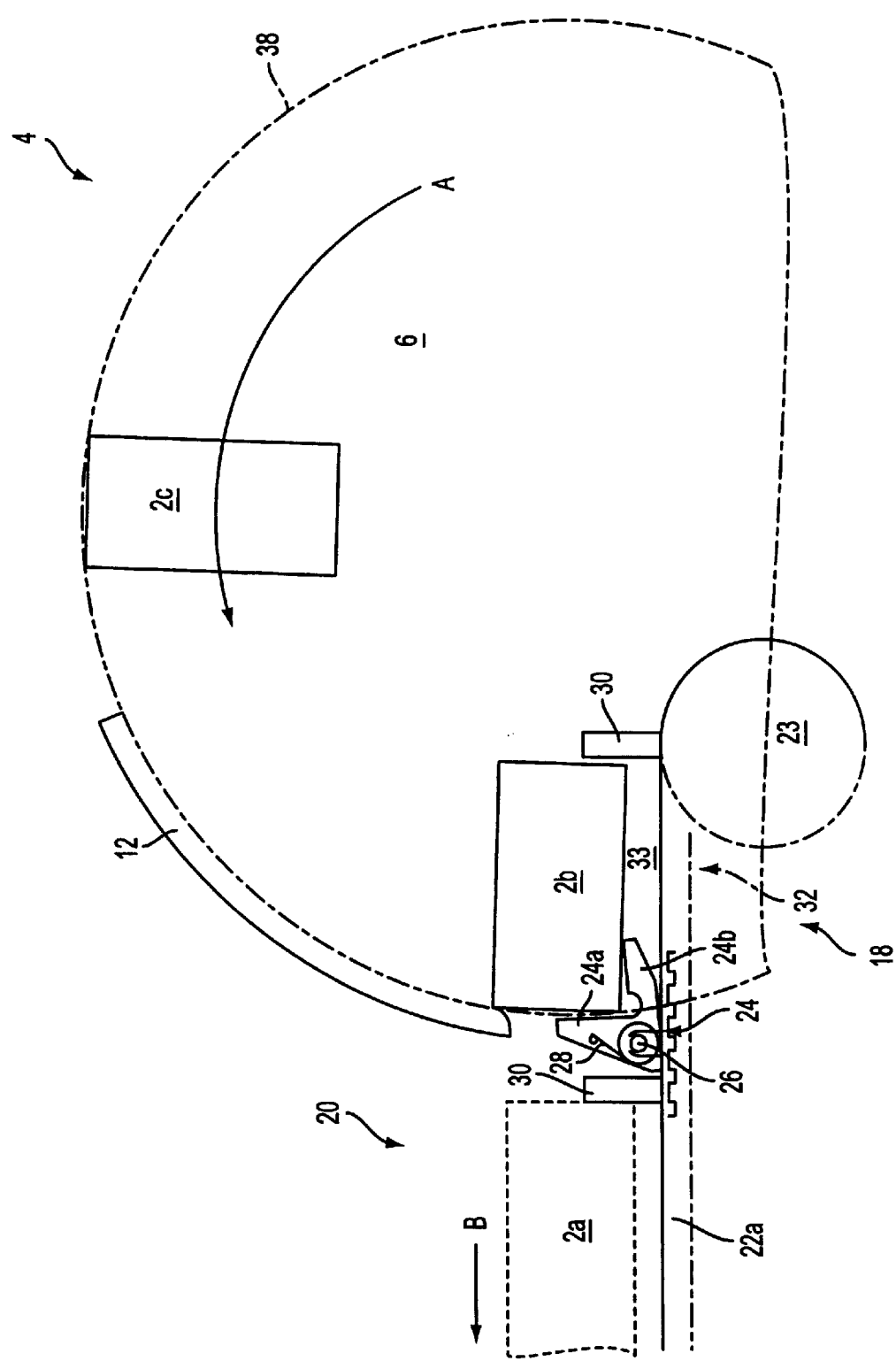
FIG. 3b shows the structure of FIG. 3a but with a commodity already received and about to be locked in the receptacle at the inlet of the first path.
Figure 3C:
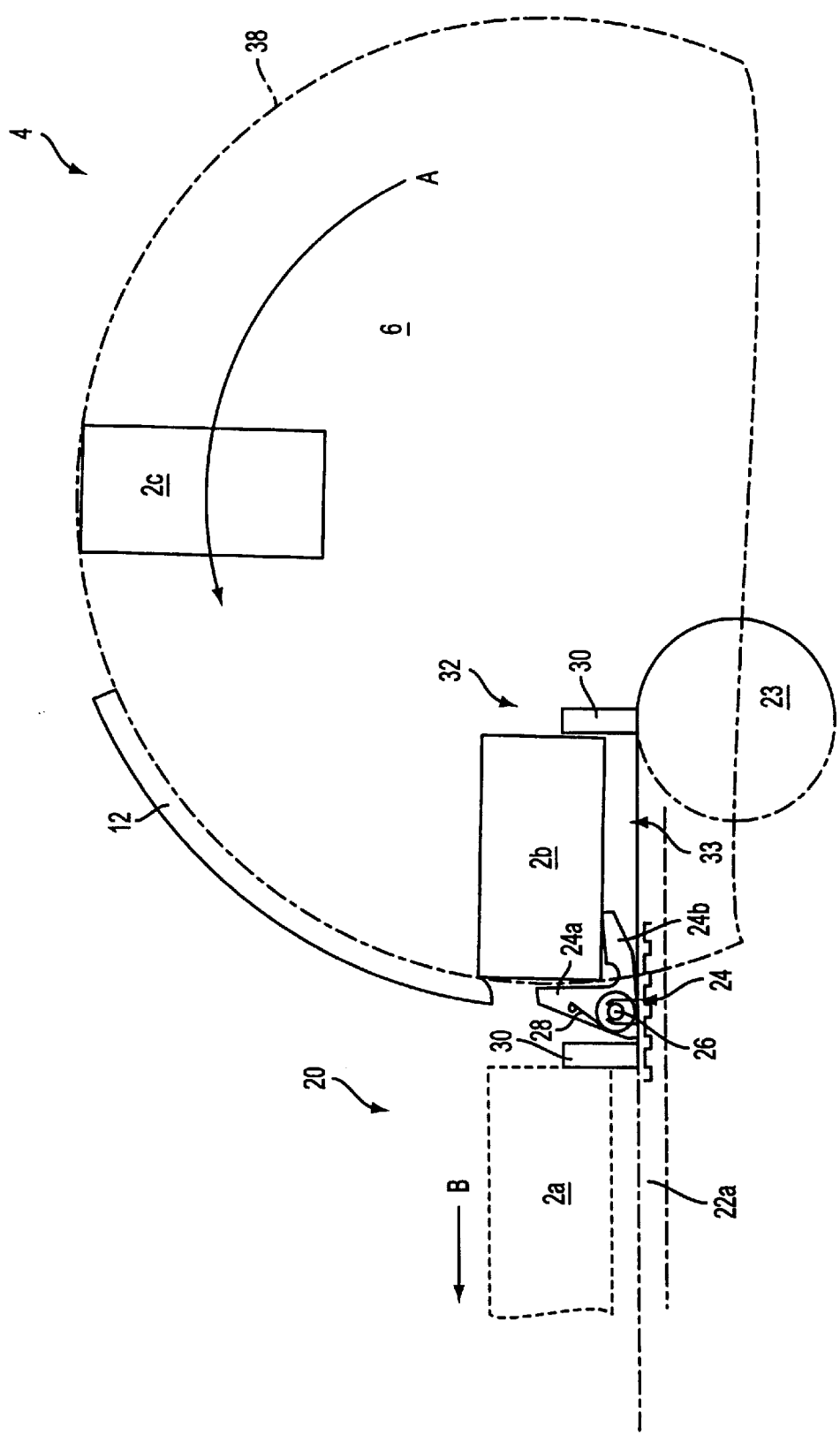
FIG. 3c shows the structure of FIG. 3b but with the commodity fully received and also locked in the receptacle at the inlet of the first path.

The carton 2b is received in those recesses 10 of the three discs 6 which are about to reach (see FIGS. 3a and 3b) or are already located at the transfer station 18 (see FIGS. 1, 2 and 3c). The carton 2c has portions received in those recesses 10 of the three discs 6 which immediately follow the recesses 10 confining portions of the carton 2b. Successive cartons of the series (i.e., those following the carton 2c) are preferably inserted into those recesses 10 which are located at the three o'clock positions of the respective discs 6 (as seen in FIG. 1).

The dimensions of the recesses 10 are preferably selected in such a way that a carton is snugly received therein during transport along a circular path in a direction indicated by the arrow A. The cartons are inserted radially inwardly toward the axis of the shaft 8 and are held by the discs 6 against undesirable movement radially or axially of the shaft 8 during indexing from the inlet of the conveyor 4 toward the transfer station 18. A carton (see the carton 2b in FIGS. 1, 2 and 3c) which has arrived at the transfer station 18 is extracted from the respective recesses 10 of the three discs 6 while moving radially of and away from the axis of the shaft 8.

It is clear that the number of discs 6 can be changed without departing from the spirit of the invention (as long as the thus modified conveyor 4 can properly coact with the conveyor 20 to ensure reliable transfer of cartons from the circular path defined by the conveyor 4 into a preferably straight path defined by the guide means of the conveyor 20). Furthermore, the conveyor 4 can be modified if the conveyed commodities are not cartons.

The conveyor 4 comprises guide means for maintaining the cartons 2b, 2c and the next-following cartons in the arcuate (preferably circular) path ending at the transfer station 18. Such guide means includes the radially outer portions of the discs 6 and an arcuate shroud 12 which can extend all the way from the station where the recesses 10 accept successive cartons of a short or long series of cartons and on to the transfer station 18. The shroud 12 can constitute a stationary piece of suitably configurated sheet metal, and the dimensions and mounting of this shroud are such that the turret including the shaft 8 and the discs 6 can be readily indexed (in the direction indicated by the arrow A) and that succesive cartons 2b, 2c, etc. can reach the transfer station 18 and can be transferred into the straight first path defined by the guide means of the conveyor 20 in the direction indicated by the arrow B.

The transporting unit 20 is a conveyor employing one or more endless flexible elements 22 in the form of belts, bands or chains. The illustrated conveyor 20 employs two endless flexible elements (hereinafter called belts for short) one of which is located between the planes of the upper and median discs 6 (as seen in FIG. 2) and the other of which is located between the planes of the median and lower discs 6 (again as seen in FIG. 2). The upper reaches or stretches 22a of the belts 22 form part of the aforementioned guide means which ensures that successive cartons 2, 2a, etc. remain in the straight path during movement in the direction of arrow B from the transfer station 18 toward the locus of transfer of cartons from the conveyor 20, e.g., to a wrapping station or to a boxing station. The other constituent of the guide means for the cartons being advanced by the conveyor 20 includes three lower guide rails 34 (see FIG. 2) and at least one upper guide rail 36 (shown only in FIG. 1). The guide rails 34 flank the cartons from below during advancement in the direction indicated by the arrow B, and the guide rail or rails 36 flanks or flank such cartons from above in a manner as shown in FIG. 1.

The belts 22 are toothed belts and are trained over at least two pulleys (one shown in each of FIGS. 1 and 3a to 3c, as at 23). The pulleys 23 which define the righthand end turns of the belts 22 are located in the spaces between the neighboring pairs of discs 6 so that the upper reaches of these belts are located beneath the recesses 10 confining portions of a carton (2b in FIGS. 3a and 3b) which is in the process of being delivered to the transfer station 18. The means for indexing the shaft 8 and for intermitently driving the pulleys 23 can comprise two discrete electric or other suitable stepping motors (not shown). FIG. 2 shows that the belts 22 are spaced apart from the respective pairs of discs 6 so that the belts can be driven while the turret of the conveyor 4 is idle and vice versa.

In accordance with a novel and important feature of the present invention, each belt 22 carries a set of equidistant holding means or receptacles 32 (hereinafter called receptacles for short) of identical sizes and shapes. The receptacles 32 are mounted and assembled in such a way that they are located at the outer (upper) sides of the upper reaches 22a while advancing from the transfer station 18 (i.e., from the inlet of the path defined at least in part by the guide members 34 and 36) in the direction indicated by the arrow B and on to the outlet (not shown) of such path. Each receptacle 32 comprises two spaced apart carton engaging elements in the form of jaws or holders 24a, 30 and means 24b for effecting a movement of at least one jaw (24a) toward the other jaw (30) when the respective receptacle is located at the inlet of the path defined by the conveyor 20, i.e., at the transfer station 18.

The jaw 24a and the respective movement effecting means 24b (hereinafter called trigger for short) constitute two arms of a bell crank lever 24 which is fulcrumed at 26 on the respective belt 22. The arms 24a, 24b, the jaw 30 and the pintle 26 which defines the fulcrum for the lever 24 are normal to the direction indicated by the arrow B when the respective receptacle 32 is located at the transfer station (inlet) 18. The arm (jaw or engaging element) 24a has a preferably plane surface which confronts a complementary plane surface of the jaw 30, and such plane surfaces are parallel to each other when the respective receptacle 32 is located in the path defined by the conveyor 20 and its chamber 33 receives a portion of a carton (such as the carton 2b shown in FIGS. 1 and 3c). When a receptacle 32 is located at the transfer station 18, the arm 24a of its lever 24 extends at least substantially vertically upwardly and the trigger or arm 24b then extends at least substantially horizontally and rearwardly, i.e., in a direction toward the jaw 30 (counter to the direction indicated by the arrow B).

Each lever 24 is biased in a counterclockwise direction (as viewed in FIG. 1) by a torsion spring 28 which is coiled around the pintle 26 and has a first leg reacting against the respective belt 22 and a second leg bearing upon a pin carried by the respective jaw 24a. Other types of resilient means can be employed with equal advantage as long as they ensure that the aforementioned plane surfaces of the jaws 24a, 30 of the receptacle 32 at the transfer station 18 define a chute or an analogous downwardly narrowing pathway for predictable entry of an approaching (descending) carton (2b in FIG. 3a) into the chamber 33 of such receptacle. The jaws 30 of the receptacles 32 are rigidly connected to (e.g., of one piece with) the respective belts 22. Each jaw 30 can constitute a plate-like external projection of the respective belt 22 and is normal to the direction indicated by the arrow B during advancement of the respective receptacle and a portion of a carton (such as 2 or 2a or 2b) therein along the horizontal path defined by the guide means 34, 36.

Each chamber 33 is open from above when the respective receptacle 32 is located at the transfer station 18, and such chamber is then bounded by the aforementioned plane surfaces of the jaws 24a, 30 as well as by a portion of the upper side of the upper reach or stretch 22a of the respective belt 22. Actually, the underside of such chamber is bounded by the upper side of the respective trigger 24b which is then located in the path of downward movement of a descending carton (such as the carton 2b shown in FIGS. 3a and 3b). Each of the FIGS. 3a to 3c merely shows a single receptacle 32; however, and as can be seen in FIG. 1, each of the belts 22 carries a set of equidistant receptacles 32.

As can be seen in FIG. 2, each of the lower guide means 34 registers with one of the three discs 6 and each thereof has an upper side extending in the direction of the arrow B. The rear end portions of the guide means 34 are spaced apart from the respective discs 6 so that they cannot interfere with the descent of a carton (such as 2b) into the two receptacles 32 then located at the inlet of the path defined by the conveyor 20, i.e., at the transfer station 18. The upper sides of the guide means 34 are flush with the upper sides of the upper reaches 22a so that they can slidably support portions of the carton 2b when the latter is properly received in the receptacles 32 dwelling at the station 18. While the carton 2b approaches (i.e., descends toward) the station 18, the upper sides of the triggers 24b then disposed at such station are located slightly above the upper sides of the guide means 34 so that the descending carton 2b must pivot the respective levers 24 against the opposition of the respective torsion springs 28 during downward movement between the then mutually inclined confronting plane surfaces of the jaws 24a, 30.

The upper guide means 36 can comprise one, two or more guide rails which serve as hold-down means for the cartons (such as the cartons 2 and 2a shown in FIG. 1) then located in the path defined by the conveyor 20. FIG. 1 shows that the right-hand end portion of the guide rail 36 shown therein has an underside which slopes downwardly toward the passage between the two guide means 34, 36 to thus ensure predictable entry of successive cartons into the path between the guide means 34, 36. The distance between the underside of the upper guide means 36 and the upper side of the lower guide means 34 equals or slightly exceeds the height of a carton so that the upper guide means 36 prevents the torsion springs 28 in the first path from dissipating energy at such times when the plane surfaces of the jaws 24a in the channel between the guide means 34, 36 should be parallel with the plane surfaces of the respective jaws 30. In accordance with a presently preferred embodiment, the apparatus (and more specifically the conveyor 20) comprises lower guide means 34 composed of three equidistant parallel rails, and upper guide means 36 also comprising three elongated equidistant guide rails each of which is coplanar with one of the lower guide rails.

FIG. 1 shows that the right-hand portions of the lower guide rails 34 are spaced apart from the transfer station 18 and that the lower end portion of the shroud 12 terminates at the level of the undersides of the upper guide rails 36; all this constitutes additional safety or precautionary undertakings to ensure predictable transfer of successive cartons from a set of three aligned recesses 10 into two receptacles 32 at the transfer station 18 even though the portion of the second path at the transfer station 18 is inclined relative to the inlet of the first path.

The mode of operation of the improved apparatus, with emphasis upon the mode of transferring cartons from the recesses 10 into the receptacles 32, is as follows:

The prime mover which indexes the conveyor 4 is set to turn the shaft 8 through angles of 90° and in a counterclockwise direction (as indicated by the arrow A shown in each of FIGS. 1 and 3a to 3c). The means for driving the pulleys 23 for the belts 22 is set to advance the belts through distances corresponding to that between two neighboring jaws 30; the pulleys 23 are set to rotate in a counterclockwise direction (as viewed in FIG. 1) so that the upper reaches 22a of the belts 22 are caused to move in the direction indicated by the arrow B. A suitable control circuit (not shown) is employed to synchronize the operation of the prime mover for the shaft 8 with the operation of the prime mover for the pulleys 23 in such a way that two aligned empty receptacles 32 (one on each of the belts 22) are located at the transfer station 18 (i.e., at the inlet of the path which is defined by the guide means 34, 36 of the conveyor 20) not later than when a carton (2b) approaches the transfer station (see FIG. 3a).

As already mentioned above, the inlet of the arcuate path defined by the guide means (including the shroud 12) of the conveyor 4 is preferably located diametrically opposite the transfer station 18, i.e., a carton which has been introduced into three aligned recesses 10 at the inlet of the arcuate path must be indexed twice (through 90° angles) in order to enter two aligned receptacles at the inlet of the straight path. The exact construction of the means for introducing cartons into the recesses 10 of the conveyor 4 forms no part of the present invention; such means can form part of the aforementioned Pewo-Fold overwrapper.

When the carton 2b reaches the position which is shown in FIG. 3a, it is located rather close to but still away from the transfer station 18. The conveyor 4 is still in motion and two receptacles 32 are already located at the inlet of the straight path, i.e., at the station 18. FIG. 3a shows only one of these receptacles 32; the other receptacle is located in front of or behind the illustrated receptacle. The lever 24 of FIG. 3a is biased by the respective torsion spring 28 so that the plane surface of the arm or jaw 24a is not parallel to the plane surface of the jaw 30, and the plane upper side of the trigger 24b of the lever is located at a level above the upper sides of the upper reaches 22a, i.e., above the level of the upper sides of the three lower guide rails 34. At such time, the conveyor 20 is at a standstill and the two receptacles 32 at the station 18 are in optimum positions to accept the oncoming carton 2b. The belts 22 are provided with or carry suitable stops (not specifically shown in the drawings) which ensure that the springs 28 can dissipate energy only until the respective levers 24 assume angular positions corresponding to that of the lever shown in FIGS. 3a and 3b. This enables the triggers 24b at the station 18 to extend into the respective chambers 33, i.e., into the path of movement of the oncoming carton 2b. At the same time, the jaw 24a of the receptacle 32 shown in FIG. 3a is located outside of the broken-line circle 38 denoting the path of movement of two radially outermost portions 2b' of the carton 2b. Of course, and as actually shown in FIG. 1, if the depth of the recesses 10 is selected to match or even exceed the corresponding dimension of a carton, the radially outermost portions 2b' are located at the peripheries or radially inwardly of the peripheries of the discs 6; the plane surface of the jaw 24a shown in FIG. 3a is then tangential (or can be tangential) to the peripheral surfaces of the discs 6. All that counts is to select the positions of the aforementioned stops (which limit the extent to which the springs 28 can dissipate energy) in such a way that the (retracted) jaws 24a at the transfer station 18 cannot prevent the underside of the descending carton 2b from reaching and depressing the triggers 24b.

FIG. 3a further shows that the jaw 30 of the receptacle 32 at the transfer station 18 is held in a position in which it permits unimpeded entry of the radially innermost portion of the carton 2b into the pocket 33 of such receptacle.

FIG. 3b shows that stage of indexing of the conveyor 4 which follows the stage shown in FIG. 3a. The lower portion of the carton 2b has already entered the chamber 33 of the receptacle 32 and is about to contact (or already contacts) the plane upper side or surface of the trigger 24b. By way of example, the angular position of the conveyor 4 must be changed through two additional degrees in order to complete the respective indexing step, i.e., to move the carton 2b to the position shown in FIGS. 1 and 3c. This last stage of indexing of the conveyor 4 causes the underside of the carton 2b to pivot the lever 24 from the angular position of FIG. 3a or 3b to the angular position of FIG. 3c. The underside of the carton 2b then lies flush against the upper side of the trigger 24b and also flush against the horizontal upper sides of the three lower guide rails 34. The spring 28 of FIGS. 3a to 3c is caused to store energy (or to store additional energy) so that it can return the respective lever 24 to the angular position of FIG. 3a or 3b as soon as the carton 2b is removed from the conveyor 20.

While pivoting (clockwise) from the angular position of FIG. 3a or 3b to the angular position of FIG. 3c, the trigger 24b causes the jaw 24a of the respective lever 24 to pivot in the same direction and to thus cause at least some shifting of the carton 2b radially inwardly toward the shaft 8 of the conveyor 4. This, in turn, causes the jaws 24a and 30 to clamp the respective portion of the carton 2b between them so that the carton is held against movement relative to the belts 22 in and counter to the direction indicated by the arrow B when the conveyor 20 is thereupon-set in notion to advance the carton by a step away from the transfer station 18. While moving in the direction of arrow B, the carton 2b is received in the chambers 33 of two receptacles 32 and lies flush against the plane surfaces of two jaws 24a, two jaws 30 and two triggers 24b, as well as against the undersides of the guide rails 36 and against the upper sides of the guide rails 34. On its way from the transfer station 18, the carton 2b advances beneath the adjacent lowermost portion of the shroud 12 and beneath the adjacent chamfered right-hand end portions of the upper guide rails 36. The three recesses 10 which served to deliver the carton 2b to the station 18 are aligned with the cartons 2 and 2a, and the shaft 8 is or can be indexed again as soon as the carton 2b is fully withdrawn from such recesses in response to starting of the conveyor 20 in a sense to advance the cartons 2, 2a and 2b in the direction of the arrow B.

As already mentioned above, the upper guide rails 36 further serve as a hold-down means in that they prevent the springs 28 from returning the levers 24 along the upper reaches 22a of the belts 22 to the angular positions (with reference to the belts) corresponding to those of the levers shown in FIGS. 3a and 3b. The guide rails 36 can perform such functions because the height of the passage between the upper sides of the lower rails 34 and the undersides of the upper rails 36 is at least close to the corresponding dimensions of the carton 2, 2a, 2b and so on. However, the springs 28 are free to dissipate at least some energy as soon as the cartons reach the outlet of the path defined by the guide rails 34, 36 so that each lever 24 which returns to the transfer station 18 is again in an optimum position to permit entry of a carton in a manner as described above with reference to FIGS. 3a, 3b and 3c.

The extent of pivotal movement of each trigger 24b between its idle (FIGS. 3a, 3b) and operative (FIGS. 1 and 3c) positions can be readily selected in such a way that, once the trigger is depressed by a carton in the chamber 33 of the respective receptacle, such carton is held with a requisite force to prevent any undesirable movements relative to the belts 22 during advancement along the straight path defined by the conveyor 20. Since the movements of the trigger 24b between idle and operative positions are effected by the cartons (i.e., by the commodities which are to be transported by the improved apparatus), this contributes significantly to simplicity, reliability, versatility and lower cost of the apparatus. Furthermore, the apparatus can readily compensate for unavoidable minor departures of the dimensions of transported cartons from ideal dimensions. Still further, the apparatus can prevent undesirable localized deformation of conveyed cartons, e.g., under excessive bias of the springs 28, because the combined upper guide rails and hold-down means 36 limit the extent of required pivoting of the levers 24 and maintain the upper sides of the triggers 24b in angular positions in which the upper sides lie flush against the underside of the respective carton.

It is clear that the triggers 24b need not be of one piece with the respective jaws 24a. All that is necessary is that the mechanical connection between the trigger 24b and the jaw 24a be sufficiently reliable to guarantee proper engagement and retention of the carton (such as 2b) which is in the process of arriving at the transfer station 18.

Still further, the apparatus can be modified by providing each receptacle 32 with a plurality of mobile jaws. For example, the jaws 30 can be replaced by jaws which are suitably coupled (e.g., by link trains) to the respective triggers 24b so that each of the several mobile jaws is pivoted, shifted and/or otherwise moved into engagement with the freshly arrived carton as soon as the carton engages and pivots and/or otherwise displaces the trigger.

In the illustrated apparatus, the shaft 8 is horizontal and the discs 6 are caused to rotate in vertical planes, However, it is also possible to employ a vertical shaft 8 and provide the shaft with a requisite number of horizontal discs 6. The illustrated embodiment, wherein the axes of the pintles 26 are normal to the planes of the discs 6, is preferred at this time. The discs 6 introduce a carton into the receptacles 32 at the transfer station 18 in such direction and in such orientation that the weight of the transferred carton also contributes to retention of the triggers 24b in optimum positions in which the triggers ensure that the jaws 24a bear upon the adjacent external surface of the carton at the station 18 with a force which is required to ensure that the carton is forced to bear against the adjacent side or surface of each of the jaws 30 at the transfer station and thereupon in the passage between the upper guide rails 36 and the lower guide rails 34.

The illustrated apparatus can be modified still further by replacing one-piece jaws 24a and/or 30, and/or one-piece triggers 24b, with composite jaws and/or triggers.

Furthermore, the carton-contacting surfaces of the jaws 24a, 30 and/or triggers 24b can be treated (e.g., coated with suitable linings) in such a way that the surfaces can engage and hold the adjacent portions of a carton with a requisite amount of friction. This further enhances the reliability of transport of the cartons along the path which is defined by the conveyor 20, i.e., in the passage between the upper guide rails 36 and the lower guide rails 34. The carton contacting surfaces of such guide rails can be treated to a finish which ensures that the frictional engagement between the guide rails and the adjacent sides of the cartons being compelled to advance along the first path is reduced to a minimum.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of apparatus for transporting block-shaped commodities or the like and, therefore, such adaptations should and are intended to be comprehended within the meaning and range of equivalence of the appended claims.

What is claimed is:

1. Apparatus for transporting commodities, comprising:
a first transporting unit including guide means defining a first path having an inlet, said unit further including driven receptacles movable along said path in a predetermined direction past and beyond said inlet, each of said receptacles comprising a plurality of commodity engaging elements including first and second elements, at least one of said first and second elements being movable relative to the other of said first and second elements between a first position in which the receptacle can accept a commodity and a second position in which a commodity being received in the receptacle is compelled to move with the receptacle along said path beyond said inlet; and
a second transporting unit comprising second guide means defining a second path including a portion arranged to deliver successive commodities of a series of commodities to the inlet of said first path, said portion of said second path and said inlet being oriented to permit entry of commodities from said second path into a receptacle at said inlet in the first position of the respective at least one engaging element, each of said receptacles further comprising means for effecting a movement of the at least one engaging element of the receptacle at said inlet toward the other engaging element of such receptacle in response to impingement upon by a commodity at said portion of said second path.

2. The apparatus of claim 1, wherein said inlet of said first path and said portion of said second path make an oblique angle.

3. The apparatus of claim 1, wherein said first and second elements are at least substantially parallel to each other in the second position of the respective at least one element.

4. The apparatus of claim 1, wherein said first and second elements have commodity contacting surfaces which are at least substantially parallel to each other and at least substantially normal to said predetermined direction in the second position of the respective at least one element.

5. The apparatus of claim 1, wherein said first and second elements of each of said receptacles are spaced apart from each other and said movement effecting means includes means for moving the at least one element toward the other element of the respective receptacle.

6. The apparatus of claim 5, wherein the at least one engaging element of each receptacle is movable relative to the respective other engaging element in and counter to said predetermined direction.

7. The apparatus of claim 1, wherein said receptacles are configurated and dimensioned to temporarily receive and transport along said first path at least substantially identical block-shaped commodities.

8. The apparatus of claim 7, wherein each of said block-shaped commodities includes at least one packet of rod-shaped articles of the tobacco processing industry.

9. The apparatus of claim 1, further comprising means for mechanically coupling said at least one engaging element of each of said receptacles to the respective movement effecting means.

10. The apparatus of claim 9, wherein said at least one engaging element of each of said receptacles is pivotable relative to the guide means of said first transporting unit.

11. The apparatus of claim 1, wherein said first transporting unit includes an endless belt conveyor.

12. The apparatus of claim 11, wherein said first path is a straight path, the first and second elements of a receptacle in said first path being located one behind the other as seen in said predetermined direction.

13. The apparatus of claim 12, wherein each of said receptacles is arranged to accept at least one commodity during advancement of the respective first and second elements along the inlet of said first path.

14. The apparatus of claim 1, wherein said first and second elements of each of said receptacles have at least substantially plane surfaces each of which contacts a commodity in the second position of the at least one element of the respective receptacle.

15. The apparatus of claim 14, wherein said plane surfaces are at least substantially parallel to each other while in contact with a commodity in said first path.

16. The apparatus of claim 14, wherein said plane surfaces are at least substantially normal to said first path while in contact with a commodity in said first path.

17. The apparatus of claim 1, wherein said second path is an arcuate path and is located in a predetermined plane, said first engaging element and said movement effecting means of each of said receptacles constituting the arms of a lever which is pivotable about an axis extending at least substantially at right angles to said predetermined plane.

18. The apparatus of claim 17, wherein said second path is a circular path.

19. The apparatus of claim 17, wherein said predetermined plane is at least substantially horizontal.

20. The apparatus of claim 19, wherein said second transporting unit comprises an indexible turret.

21. The apparatus of claim 1, wherein the movement effecting means of each of said receptacles is movable by a commodity at said inlet from an idle position to an operative position to thus effect said movement of the at least one engaging element toward the other engaging element of the respective receptacle.

22. The apparatus of claim 21, wherein each of said receptacles further comprises means for yieldably biasing the respective at least one engaging element to said idle position.

23. The apparatus of claim 22, further comprising hold-down means for maintaining the commodity which has moved the movement effecting means at said inlet to the operative position in engagement with the respective movement effecting means.

24. The apparatus of claim 23, wherein said hold-down means forms part of the guide means defining said first path.

25. The apparatus of claims 23, wherein said hold-down means is arranged to engage the commodity in said first path at and downstream of said inlet, as seen in said predetermined direction.

26. The apparatus of claim 23, wherein said hold-down means defines a portion of said first path.

27. The apparatus of claim 23, wherein said hold-down means is stationary.

28. The apparatus of claim 23, wherein said hold-down means and a receptacle advancing along said first path define a chamber for a commodity in said first path, said hold-down means and the movement effecting means of the receptacles in said first path facing each other and confining the commodities to movement along said first path.

29. The apparatus of claims 23, wherein said hold-down means comprises at least one elongated stationary rail along which successive commodities slide during movement along said first path.

30. The apparatus of claim 1, wherein said at least one engaging element of each of said receptacles is rigidly connected with the movement effecting means of the respective receptacle.

31. The apparatus of claim 18, wherein each of said receptacles comprises a lever pivotable relative to the guide means of said first transporting unit, each of said levers including a first arm constituting said at least one element and a second arm constituting the movement effecting means of the respective receptacle.

32. The apparatus of claim 31, wherein each of said receptacles further comprises a fulcrum for the respective lever, said arms extending at least substantially at right angles to an axis of the respective fulcrum.

33. The apparatus of claim 31, wherein the first arms of said levers are at least substantially normal to the respective second arms.

34. The apparatus of claim 31, wherein each of said first arms has a first commodity-contacting surface and each of said second arms has a second commodity contacting surface at least substantially normal to the respective first surface.

35. The apparatus of claim 31, wherein each of said levers is pivotable abut a substantially horizontal axis.

36. The apparatus of claim 35, wherein the axes of said levers are at least substantially normal to said predetermined direction.

\* \* \* \* \*